(12) United States Patent
Okubo et al.

(10) Patent No.: US 11,052,743 B2
(45) Date of Patent: Jul. 6, 2021

(54) OIL MAINTENANCE STRATEGY FOR ELECTRIFIED VEHICLES

(71) Applicant: FORD GLOBAL TECHNOLOGIES, LLC, Dearborn, MI (US)

(72) Inventors: Shunsuke Okubo, Belleville, MI (US); Floyd Cadwell, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1326 days.

(21) Appl. No.: 14/855,820

(22) Filed: Sep. 16, 2015

(65) Prior Publication Data
US 2017/0074177 A1    Mar. 16, 2017

(51) Int. Cl.
| | |
|---|---|
| *B60K 6/22* | (2007.10) |
| *F01M 11/10* | (2006.01) |
| *F01M 5/00* | (2006.01) |
| *B60K 6/445* | (2007.10) |
| *B60W 20/15* | (2016.01) |
| *B60W 10/06* | (2006.01) |
| *B60W 10/08* | (2006.01) |
| *F02D 41/04* | (2006.01) |

(52) U.S. Cl.
CPC .............. *B60K 6/22* (2013.01); *B60K 6/445* (2013.01); *B60W 10/06* (2013.01); *B60W 10/08* (2013.01); *B60W 20/15* (2016.01); *F01M 5/001* (2013.01); *F01M 11/10* (2013.01); *B60Y 2200/92* (2013.01); *B60Y 2306/03* (2013.01); *F02D 41/04* (2013.01); *F02D 2250/11* (2013.01); *F16N 2200/00* (2013.01); *Y10S 903/903* (2013.01)

(58) Field of Classification Search
CPC ...... B60K 6/22; B60K 6/445; B60Y 2200/92; B60Y 2306/03; F01M 11/10; F01M 5/001; F02D 2250/11; F02D 41/04; F16N 2200/00; Y10S 903/903; B60W 10/06; B60W 10/08; B60W 20/15
See application file for complete search history.

(56) References Cited

U.S. PATENT DOCUMENTS

| | | | | |
|---|---|---|---|---|
| 4,524,645 | A | * | 6/1985 | Tatsumi ................. F16H 59/72 477/163 |
| 6,571,157 | B1 | | 5/2003 | Dahlin et al. |
| 7,395,803 | B2 | * | 7/2008 | Ledger .................. B60K 6/445 123/196 R |

(Continued)

FOREIGN PATENT DOCUMENTS

CN    101898553 A    12/2010

OTHER PUBLICATIONS

Acura, Press Release Article, 2014 Acura RLX: Powertrain, 2014 Acura RLX Sport Hybrid SH-AWD; Powertrain, Dec. 5, 2013, seven pages.

(Continued)

*Primary Examiner* — David Hamaoui
*Assistant Examiner* — Ruben Picon-Feliciano
(74) *Attorney, Agent, or Firm* — David B. Kelley; Carlson, Gaskey & Olds (57) ABSTRACT

A method according to an exemplary aspect of the present disclosure includes, among other things, periodically adjusting powertrain operation of an electrified vehicle equipped with an internal combustion engine to progressively influence oil quality of oil of the internal combustion engine.

19 Claims, 4 Drawing Sheets

(56) References Cited

U.S. PATENT DOCUMENTS

| | | | |
|---|---|---|---|
| 8,136,616 B2 | 3/2012 | Padilla et al. | |
| 8,868,283 B2 | 10/2014 | Geng et al. | |
| 2003/0126915 A1* | 7/2003 | Kiyota | B60L 3/00 |
| | | | 73/115.01 |
| 2007/0173983 A1* | 7/2007 | Takahashi | B60R 1/00 |
| | | | 701/1 |
| 2011/0106360 A1* | 5/2011 | Wu | B60K 1/00 |
| | | | 701/22 |
| 2012/0141297 A1* | 6/2012 | Jeong | B60K 6/48 |
| | | | 417/5 |
| 2013/0000601 A1* | 1/2013 | VanDerWege | F02D 41/06 |
| | | | 123/435 |
| 2013/0268182 A1* | 10/2013 | Treharne | F02N 11/0829 |
| | | | 701/113 |
| 2013/0342150 A1* | 12/2013 | Ozaki | B60L 3/0061 |
| | | | 318/490 |
| 2014/0058647 A1 | 2/2014 | Haladyna et al. | |
| 2014/0114511 A1* | 4/2014 | Sangameswaran | B60W 10/06 |
| | | | 701/22 |
| 2015/0065293 A1* | 3/2015 | Ando | B60K 6/52 |
| | | | 477/1 |
| 2015/0066259 A1 | 3/2015 | Thompson | |
| 2016/0214600 A1* | 7/2016 | Miyaishi | B60K 6/48 |

OTHER PUBLICATIONS

Notification of Second Office Action for CN Application No. 2016108186107 dated Feb. 20, 2021.

* cited by examiner

OIL MAINTENANCE STRATEGY FOR ELECTRIFIED VEHICLES

TECHNICAL FIELD

This disclosure relates to an oil maintenance strategy for an electrified vehicle. Powertrain operation of the electrified vehicle may be periodically adjusted to progressively influence oil quality of engine oil.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Contaminants such as oil, gas and water must be periodically removed from the oil of an internal combustion engine to achieve efficient operation and for engine protection. Electrified vehicles equipped with internal combustion engines, such as hybrid vehicles, typically include a passive oil minder feature that forces the internal combustion engine into high power operation to help evaporate the contaminants. This is referred to as a forced engine pull-up. Such forced engine operation, which only occurs after the oil quality has deteriorated below a threshold value, may be undesirable to many electrified vehicle operators.

SUMMARY

A method according to an exemplary aspect of the present disclosure includes, among other things, periodically adjusting powertrain operation of an electrified vehicle equipped with an internal combustion engine to progressively influence oil quality of oil of the internal combustion engine.

In a further non-limiting embodiment of the foregoing method, the method includes determining a measured oil quality number of the oil.

In a further non-limiting embodiment of either of the foregoing methods, determining the measured oil quality number includes estimating the measured oil quality number based on at least one operating parameter of the internal combustion engine.

In a further non-limiting embodiment of any of the foregoing methods, the at least one operating parameter is a number of cold starts of the internal combustion engine.

In a further non-limiting embodiment of any of the foregoing methods, the method includes comparing the measured oil quality number to an oil quality target value.

In a further non-limiting embodiment of any of the foregoing methods, the method includes continuing to actively monitor the measured oil quality number if the measured oil quality number exceeds the oil quality target value.

In a further non-limiting embodiment of any of the foregoing methods, the method includes determining a normalized oil quality number if the measured oil quality number is below the oil quality target value.

In a further non-limiting embodiment of any of the foregoing methods, the normalized oil quality number is a scaled value derived from the measured oil quality number.

In a further non-limiting embodiment of any of the foregoing methods, adjusting the powertrain operation includes adjusting the powertrain operation by a calibratable value that is based on the normalized oil quality number.

In a further non-limiting embodiment of any of the foregoing methods, adjusting the powertrain operation includes modifying engine speed.

In a further non-limiting embodiment of any of the foregoing methods, adjusting the powertrain operation includes applying an engine pull-up threshold modifier.

In a further non-limiting embodiment of any of the foregoing methods, adjusting the powertrain operation includes applying a battery charge modifier.

In a further non-limiting embodiment of any of the foregoing methods, adjusting the powertrain operation includes increasing a temperature of the oil gradually over time and without requiring a forced engine pull-up.

In a further non-limiting embodiment of any of the foregoing methods, adjusting the powertrain operation is performed automatically without any required input from an operator of the electrified vehicle.

In a further non-limiting embodiment of any of the foregoing methods, adjusting the powertrain operation occurs without requiring any forced engine pull-ups.

An electrified vehicle according to another exemplary aspect of the present disclosure includes, among other things, a set of drive wheels, a battery pack configured to selectively power the drive wheels, an engine configured to selectively power the drive wheels, and a control system configured to influence an oil quality number of oil of the engine without requiring a forced pull-up of the engine.

In a further non-limiting embodiment of the foregoing electrified vehicle, the control system is configured to measure the oil quality number, normalize the oil quality number and adjust powertrain operation of the electrified vehicle based on a normalized oil quality number.

In a further non-limiting embodiment of either of the foregoing electrified vehicles, at least one look-up table is stored in a memory device of the control system.

In a further non-limiting embodiment of any of the foregoing electrified vehicles, the control system is configured to apply a calibratable offset to a parameter of the engine to influence the oil quality number.

In a further non-limiting embodiment of any of the foregoing electrified vehicles, the control system is configured to apply a calibratable offset to a parameter of the battery pack to influence the oil quality number.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details an oil maintenance strategy for electrified vehicles. Powertrain operation of an electrified vehicle equipped with an internal combustion engine may be periodically adjusted to actively and progressively influence the oil quality of engine oil. The oil maintenance strategy may include measuring or inferring an oil quality number, normalizing the oil quality number, and adjusting the powertrain operation based on the normalized value. These and other features are discussed in greater detail in the following paragraphs of this detailed description.

Figure 1:
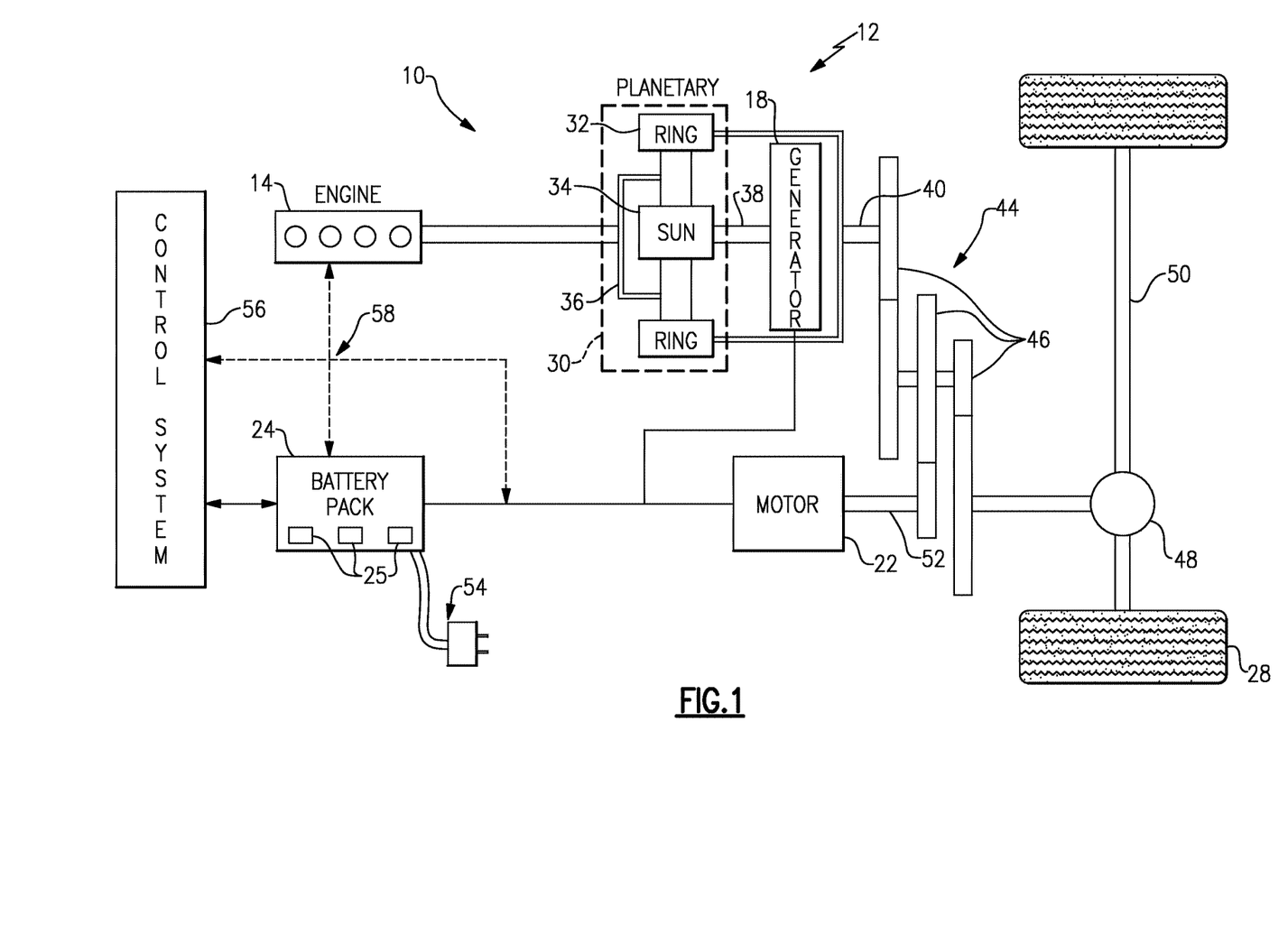
FIG. 1 schematically illustrates a powertrain of an electrified vehicle.

FIG. 1 schematically illustrates a powertrain 10 for an electrified vehicle 12. Although generally depicted as a hybrid electric vehicle (HEV), it should be understood that the concepts described herein are not limited to HEV's and could extend to other electrified vehicles, including, but not limited to, plug-in hybrid electric vehicles (PHEV's) or any other electrified vehicle equipped with an internal combustion engine.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Non-power-split architectures may also benefit from the teachings of this disclosure.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting PHEV embodiment of the electrified vehicle 12, the battery pack 24 may be recharged or partially recharged using a charger module 54 that is connectable to a charging station or power outlet powered by an external power source, such as an electrical grid, a solar panel, or the like.

The powertrain 10 may additionally include a control system 56 for monitoring and/or controlling various aspects of the electrified vehicle 12. For example, the control system 56 may communicate with the engine 14, the battery pack 24, the motor 22 and other vehicle components to monitor the electrified vehicle 12, control the electrified vehicle 12, or both. In another non-limiting embodiment, as further discussed below, the control system 56 is configured to monitor and adjust the oil quality of the oil of the engine 14. A controller area network (CAN) 58 allows the control system 56 to communicate with the various components of the electrified vehicle 12.

The control system 56 may include electronics, software, or both to perform the necessary control functions for controlling the electrified vehicle 12. In one non-limiting embodiment, the control system 56 is a combination vehicle system controller (VSC) and powertrain control module. Although shown as a single hardware device, the control system 56 may include multiple controllers in the form of multiple hardware devices, or multiple software controllers within one or more hardware devices. In another non-limiting embodiment, each of the engine 14 and the battery pack 24 may include individual control modules, and these control modules may communicate with one another and with the control system 56 over the CAN 58 to influence oil quality within the engine 14.

In one non-limiting embodiment, the electrified vehicle 12 includes at least two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Over time, the quality of the oil used by the engine 14 may deteriorate because of the accumulation of contaminants such as oil, gas and/or water. These contaminants must be removed from the oil to improve performance of the engine 14. An oil maintenance strategy, which may also be referred to as an oil minder feature, is described below for progressively restoring oil quality.

Figure 2:
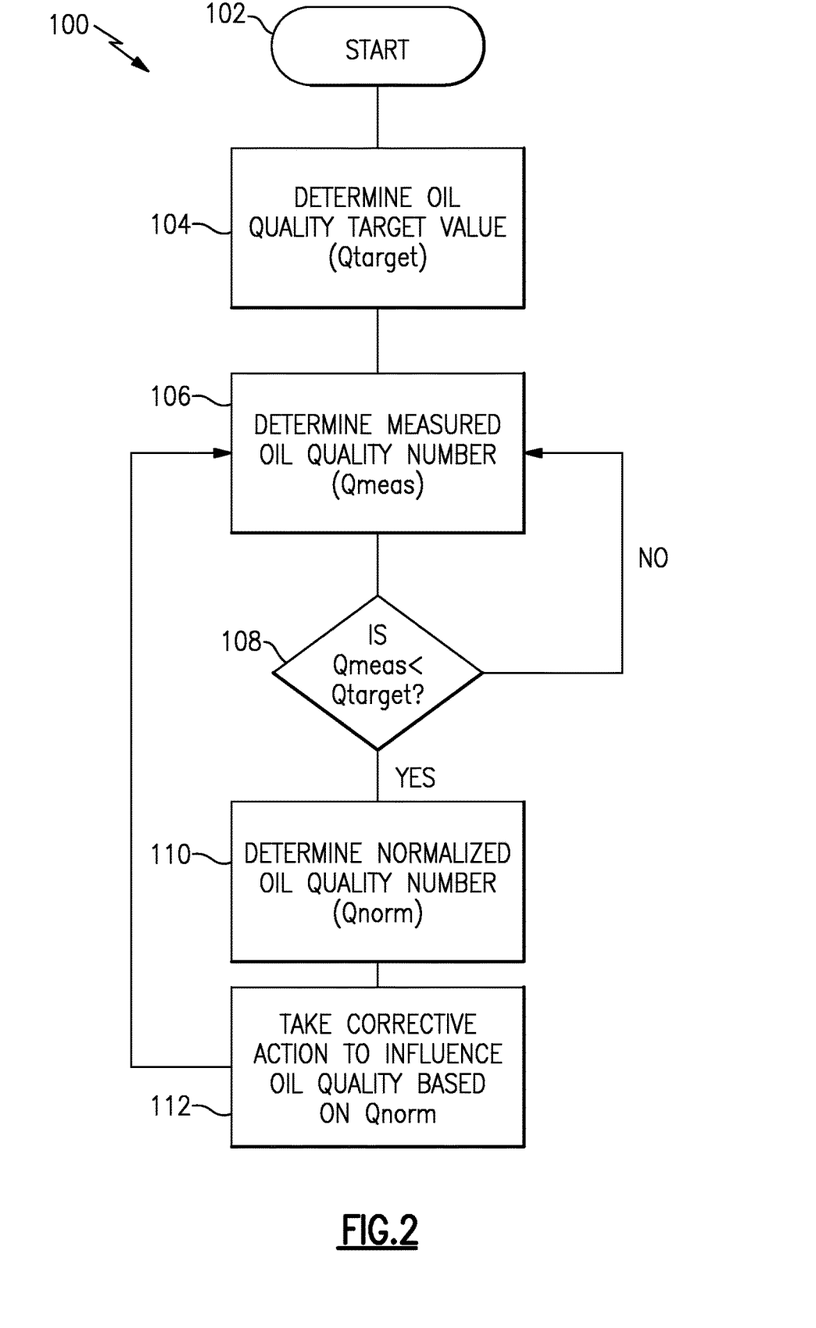
FIG. 2 schematically illustrates a control strategy for actively influencing the oil quality of the oil used by an internal combustion engine of an electrified vehicle.

FIG. 2, with continued reference to FIG. 1, schematically illustrates a control strategy 100 for actively and progressively influencing the oil quality of the oil used by the engine 14 of the electrified vehicle 12. The oil quality is "progressively" influenced in that it is gradually improved over time as opposed to waiting until after the oil quality has fallen below a threshold value such that forced engine pull-ups are necessary to remove oil contaminants. The exemplary control strategy 100 may include actively monitoring an oil quality number and then adjusting powertrain operating parameters to avoid forced engine pull-ups based on the monitored oil quality number. Of course, the electrified vehicle 12 is capable of implementing and executing other control strategies within the scope of this disclosure. In one non-limiting embodiment, the control system 56 is programmed with one or more algorithms adapted to execute the control strategy 100, or any other control strategy. The control strategy 100 may be stored as executable instructions in the non-transitory memory of the control system 56, in one non-limiting embodiment.

As shown in FIG. 2, the control strategy 100 begins at block 102. At block 104, the control strategy 100 may determine an oil quality target value $Q_{target}$. The oil quality target value $Q_{target}$ represents the threshold against which a measured oil quality number $Q_{meas}$ is compared to determine whether the oil quality of the oil of the engine 14 has deteriorated to such a level that a corrective action is required. In one non-limiting embodiment, the oil quality target value $Q_{target}$ is a quantitative value that can be expressed generically as an integer between the numbers 1 and 10. The oil quality target value $Q_{target}$ may be set at any value and is a design specific parameter of the control strategy 100. In one non-limiting embodiment, the oil quality target value $Q_{target}$ is stored in the memory of the control system 56, such as within a look-up table. In another embodiment, the oil quality target value $Q_{target}$ is a variable value that could change based on ambient temperatures, vehicle speed, etc.

Next, at block 106, the measured oil quality number $Q_{meas}$ associated with the oil used by the engine 14 may be measured or inferred. The measured oil quality number $Q_{meas}$ can be expressed generically as an integer between 0 and 10 and represents an estimate of the amount of contaminants within the engine oil, with '0' representing relatively poor oil quality and '10' representing relatively good oil quality, for example. The measured oil quality number $Q_{meas}$ may be estimated based on one or more operating parameters of the engine 14. In one non-limiting embodiment, the operating parameter is the number of cold starts of the engine 14 (i.e., the number of times the engine 14 is forced into operation). The measured oil quality number $Q_{meas}$ could be estimated based on a single engine parameter or a combination of engine parameters within the scope of this disclosure.

Figure 3:
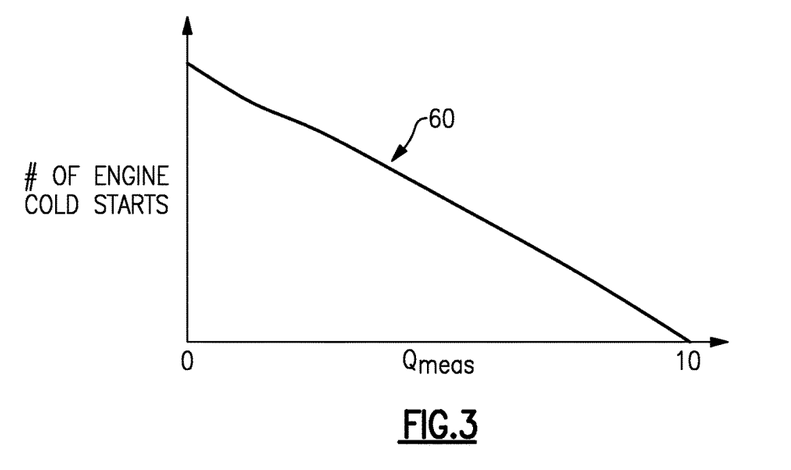
FIG. 3 is a graphical representation of an engine oil quality measurement.

An exemplary plot 60 of the measured oil quality number $Q_{meas}$ is shown in FIG. 3. As illustrated, the measured oil quality number $Q_{meas}$ (shown on the X-axis) may be a function of the number of engine cold starts (shown on the Y-axis). As also indicated by the plot 60, the measured oil quality number $Q_{meas}$ decreases as the number of cold starts increases. In other words, the measured oil quality number $Q_{meas}$ is inversely related to the number of engine cold starts.

Referring again to FIG. 2, the measured oil quality number $Q_{meas}$ is next compared against the oil quality target value $Q_{target}$ at block 108. If the measured oil quality number $Q_{meas}$ exceeds the oil quality target value $Q_{target}$, the control strategy 100 returns to block 106 and actively continues to monitor the measured oil quality number $Q_{meas}$. If, however, the measured oil quality number $Q_{meas}$ is determined to be less than the oil quality target value $Q_{target}$, indicating that the oil quality is below a desired threshold of quality, the control strategy 100 may proceed to block 110 by normalizing the measured oil quality number $Q_{meas}$. In one non-limiting embodiment, a normalized engine oil quality number $Q_{norm}$ may be derived from logic stored in a look-up table stored in the memory of the control system 56.

Figure 4:
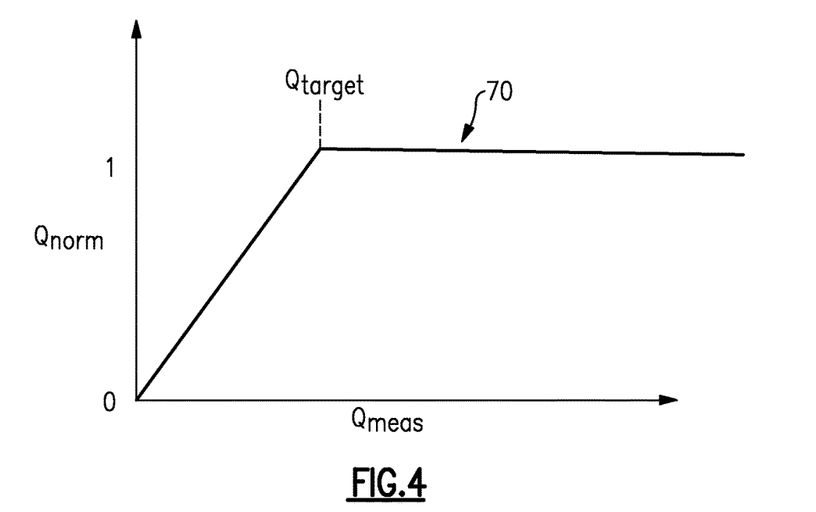
FIG. 4 is a graphical representation of an engine oil quality normalization strategy.

An exemplary plot 70 of the normalized oil quality number $Q_{norm}$ is shown in FIG. 4. The normalized oil quality number $Q_{norm}$ (shown on Y-axis) is calculated as a function of the measured oil quality number $Q_{meas}$ (shown on the X-axis), and in its simplest form is a simple adjustment of the measured oil quality number $Q_{meas}$ to a different scale. In one non-limiting embodiment, the normalized engine oil quality number $Q_{norm}$ may be expressed as a value between 0 and 1. The normalized engine oil quality number $Q_{norm}$ may level off near the point of the plot 70 at which the measured oil quality number $Q_{meas}$ reaches the oil quality target value $Q_{target}$.

Finally, as shown in block 112 of FIG. 2, a corrective action may be taken, based on the normalized engine oil quality number $Q_{norm}$, to influence the oil quality number of the engine oil. In one non-limiting embodiment, powertrain operation of the electrified vehicle 12 is adjusted to influence the oil quality number. The powertrain operation adjustment may be a function of the normalized engine oil quality number $Q_{norm}$. Adjusting powertrain operation may include, but is not limited to, modifying engine speed, modifying engine torque, modifying spark retard, modifying how often the engine runs, etc. to increase oil/coolant temperatures, and thereby influence the oil quality number.

Figure 5A:
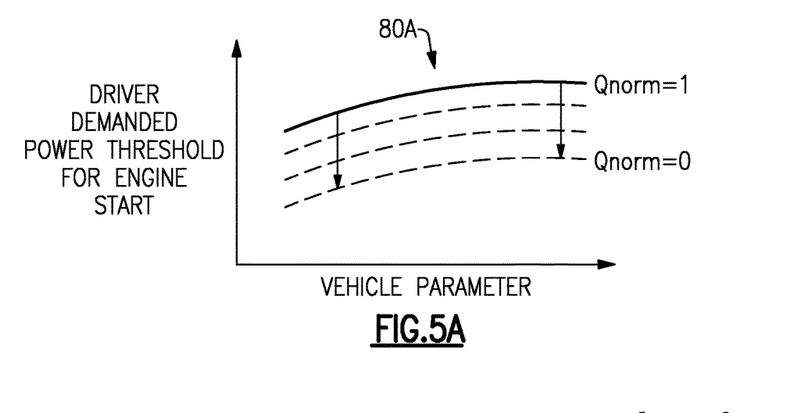
FIGS. 5A, 5B and 5C are graphical representations of powertrain operation modifiers for increasing engine oil quality in an active, progressive manner.
Figure 5B:
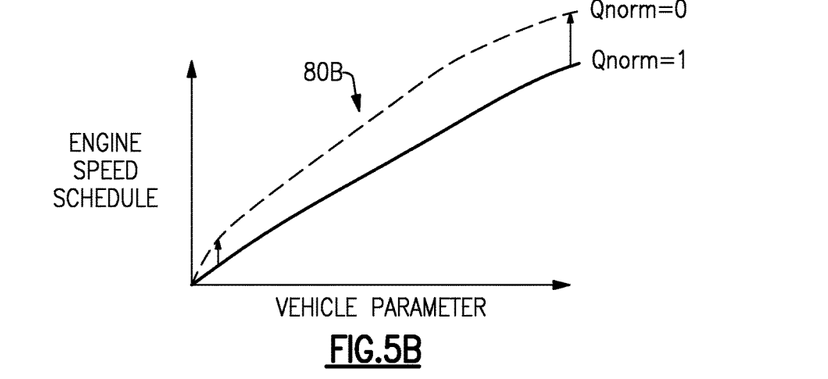
Figure 5C:
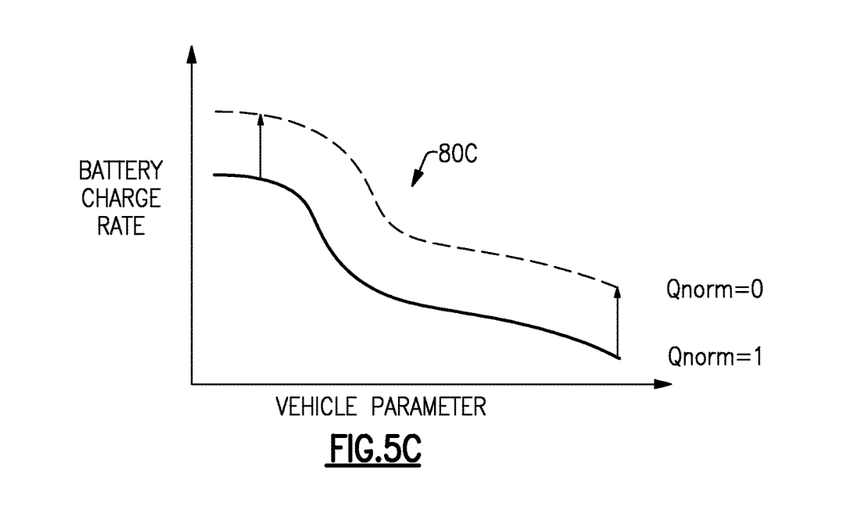

FIGS. 5A, 5B and 5C provide graphical illustrations of several example powertrain operation adjustments for influencing the oil quality number of engine oil. Referring first to FIG. 5A, an exemplary plot 80A is shown for adjusting powertrain operation using an engine pull-up threshold modifier. The plot 80A graphs the driver demanded power threshold for engine start (shown on Y-axis) versus a vehicle parameter (e.g., vehicle speed, pedal position, etc., shown on X-axis) based on the normalized engine oil quality number $Q_{norm}$. As shown by the plot 80A, the amount of demanded power necessary for the engine 14 to be started decreases as the normalized oil quality number $Q_{norm}$ decreases toward 0.

In one non-limiting embodiment, the value of the engine pull-up threshold modifier may be derived from logic stored in a look-up table saved in the memory of the control system 56. The plot 80A is a simple graphical representation of the type of information that may be stored in the look-up table. The engine pull-up threshold modifier represents a calibratable value by which the engine 14 can be forced to run more frequently to achieve higher oil/coolant temperatures, thereby influencing the oil quality number.

Plot 80B of FIG. 5B illustrates an engine speed modifier for adjusting powertrain operation to influence the oil quality. The plot 80B graphs an engine speed schedule (shown on the Y-axis) versus a vehicle parameter (e.g., vehicle speed, pedal position, etc., shown on X-axis) based on the normalized engine oil quality number $Q_{norm}$. As shown by the plot 80B, the engine speed modifier increases as the normalized oil quality number $Q_{norm}$ decreases. In one non-limiting embodiment, the value of the engine speed modifier may be derived from logic stored in a look-up table saved in the memory of the control system 56. The plot 80B is a simple graphical representation of the type of information that may be stored in the look-up table. The engine speed modifier may be a calibratable value by which the engine speed may be increased to achieve higher oil/coolant temperatures, thereby actively influencing the oil quality number. In one non-limiting embodiment, the engine speed modifier is a calibratable offset applied to engine speed tables that are stored within the memory of the control system 56.

Finally, plot 80C of FIG. 5C illustrates a battery charge modifier for adjusting powertrain operation to actively influence the oil quality. The plot 80C graphs the battery charge rate (shown on Y-axis) versus a vehicle parameter (e.g., vehicle speed, pedal position, driver demanded power, etc., shown on X-axis) based on the normalized engine oil quality number $Q_{norm}$. As shown by the plot 80C, the battery charge modifier increases as the normalized oil quality number $Q_{norm}$ decreases, thus indicating that higher engine powers can be achieved by using the engine 14 to charge the battery pack 24 (in addition to providing propulsion) when oil quality is poor. In one non-limiting embodiment, the value of the battery charge modifier may be derived from logic stored in a look-up table saved in the memory of the control system 56. The plot 80C is a simple graphical representation of the type of information that may be stored in the look-up table. The battery charge modifier may be a calibratable value for scheduling charging of the battery pack 24 in a manner that increases engine usage and reduces battery usage, thereby actively influencing the oil quality number. In one non-limiting embodiment, the battery charge modifier is a calibratable offset applied to battery charge tables that are stored within the memory of the control system 56. The excess energy created by the engine 14 in this type of situation may be stored in the battery pack 24 for later use.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   periodically adjusting powertrain operation of an electrified vehicle equipped with an internal combustion engine to progressively influence an oil quality of an oil of the internal combustion engine,
   wherein progressively influencing the oil quality includes reducing an amount of contaminants in the oil,
   wherein adjusting the powertrain operation includes applying an engine pull-up threshold modifier.

2. The method as recited in claim 1, comprising determining a measured oil quality number of the oil.

3. The method as recited in claim 2, wherein determining the measured oil quality number includes estimating the measured oil quality number based on at least one operating parameter of the internal combustion engine.

4. The method as recited in claim 3, wherein the at least one operating parameter is a number of cold starts of the internal combustion engine.

5. The method as recited in claim 2, comprising comparing the measured oil quality number to an oil quality target value.

6. The method as recited in claim 5, comprising continuing to actively monitor the measured oil quality number if the measured oil quality number exceeds the oil quality target value.

7. The method as recited in claim 5, comprising determining a normalized oil quality number if the measured oil quality number is below the oil quality target value.

8. The method as recited in claim 7, wherein the normalized oil quality number is a scaled value derived from the measured oil quality number.

9. The method as recited in claim 8, wherein adjusting the powertrain operation includes adjusting the powertrain operation by a calibratable value that is based on the normalized oil quality number.

10. The method as recited in claim 1, wherein adjusting the powertrain operation includes modifying engine speed.

11. The method as recited in claim 1, wherein adjusting the powertrain operation includes increasing a temperature of the oil gradually over time and without requiring a forced engine pull-up.

12. The method as recited in claim 1, wherein adjusting the powertrain operation is performed automatically without any required input from an operator of the electrified vehicle.

13. The method as recited in claim 1, wherein adjusting the powertrain operation occurs without requiring any forced engine pull-ups.

14. The method as recited in claim 1, wherein reducing the amount of contaminants in the oil includes reducing an amount of oil, gas, or water in the oil.

15. A method, comprising:
    periodically adjusting powertrain operation of an electrified vehicle equipped with an internal combustion engine to progressively influence an oil quality of an oil of the internal combustion engine,
    wherein progressively influencing the oil quality includes reducing an amount of contaminants in the oil,
    wherein adjusting the powertrain operation includes applying a battery charge modifier.

16. A method, comprising:
measuring or inferring an oil quality number associated with an oil of an engine of an electrified vehicle;
normalizing the oil quality number; and
adjusting operation of a powertrain of the electrified vehicle based on the normalized oil quality number, thereby reducing an amount of contaminants in the oil,
wherein adjusting the operation of the powertrain gradually improves the oil quality number over time and without requiring forced pull-ups of the engine.

17. The method as recited in claim 16, wherein the measured or inferred oil quality number is as an integer between 0 and 10 and represents an estimate of the amount of the contaminants within the oil.

18. The method as recited in claim 16, wherein the oil quality number is measured or inferred based on a number of cold starts of the engine.

19. The method as recited in claim 16, wherein the oil quality number is normalized if the oil quality number that is measured or inferred is below an oil quality target value.

* * * * *